(12) United States Patent
Momose et al.

(10) Patent No.: US 8,077,329 B2
(45) Date of Patent: Dec. 13, 2011

(54) DISPLAY DEVICE OF ELECTRONIC APPARATUS

(75) Inventors: Norihide Momose, Kyoto (JP);
Norihide Kunikawa, Osaka (JP);
Suehiro Ueda, Nara (JP); Masayuki Gomi, Nara (JP); Atsushi Umekage, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 1193 days.

(21) Appl. No.: 10/551,250

(22) PCT Filed: Apr. 2, 2004

(86) PCT No.: PCT/JP2004/004883
§ 371 (c)(1),
(2), (4) Date: Jul. 12, 2006

(87) PCT Pub. No.: WO2004/091189
PCT Pub. Date: Oct. 21, 2004

(65) Prior Publication Data
US 2006/0279810 A1    Dec. 14, 2006

(30) Foreign Application Priority Data

Apr. 3, 2003 (JP) .................................. 2003-100569

(51) Int. Cl.
*G06F 3/00* (2006.01)
*G06F 3/048* (2006.01)
*G06F 3/12* (2006.01)
*G03G 15/00* (2006.01)

(52) U.S. Cl. ....... 358/1.13; 715/712; 715/713; 715/771; 715/772; 715/817; 715/818; 715/819; 715/820; 715/828; 715/829; 399/81

(58) Field of Classification Search .................. 715/712, 715/713, 771, 772, 817, 818, 819, 820, 828, 715/829, 965, 970; 399/81; 358/1.13
See application file for complete search history.

(56) References Cited

U.S. PATENT DOCUMENTS

| 4,640,607 | A | * | 2/1987 | Bray | ............................. 399/364 |
| 4,944,031 | A | * | 7/1990 | Yoshino et al. | ................. 399/19 |
| 6,996,781 | B1 | * | 2/2006 | Myers et al. | ................... 715/763 |
| 2001/0026290 | A1 | | 10/2001 | Machida et al. | |

FOREIGN PATENT DOCUMENTS

| JP | 2001-142616 | 5/2001 |
| JP | 2001-273068 | 10/2001 |
| JP | 2001-274932 | 10/2001 |

OTHER PUBLICATIONS

International Search Report of PCT/JP2004/004883, mailed Jun. 29, 2004.

* cited by examiner

*Primary Examiner* — King Poon
*Assistant Examiner* — Vincent Peren
(74) *Attorney, Agent, or Firm* — Nixon & Vanderhye P.C.

(57) ABSTRACT

A display device of an electronic apparatus according to the present invention is a display device of an electronic apparatus for setting a plurality of conditions for a process of the electronic apparatus through an input portion 57 while displaying the conditions before the electronic apparatus performs the process in accordance with the conditions. The device comprises a determination portion 58 of determining whether or not each of the conditions has not yet been set, and a liquid crystal display panel 41 of displaying notifying information indicating to what degree conditions remain to be set. The liquid crystal display panel 41 displays buttons for setting the respective conditions on a screen thereof, and displays button(s) which have already been pressed as being unfilled and the number of buttons which have not yet been pressed. Therefore, by viewing the screen, the number and types of conditions which have not yet set can be known.

12 Claims, 12 Drawing Sheets

FIG.8
(a) 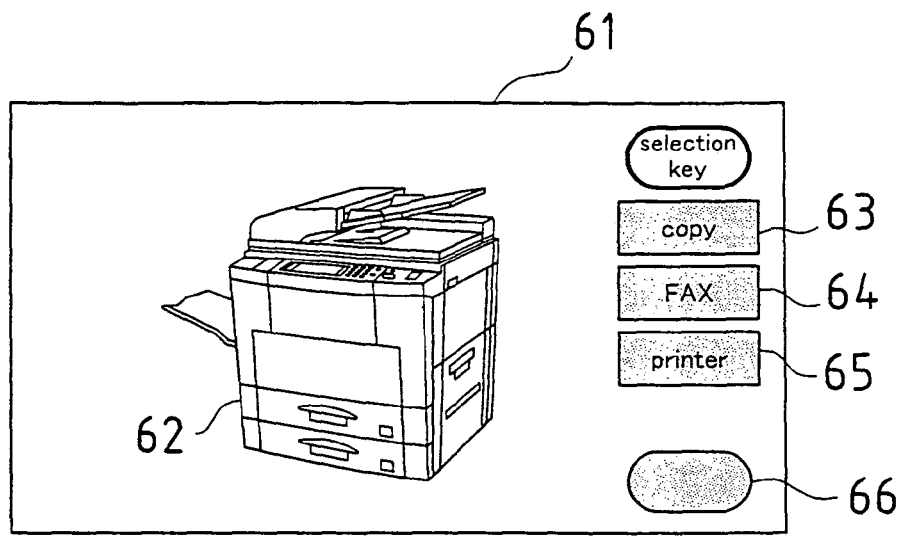
(b) 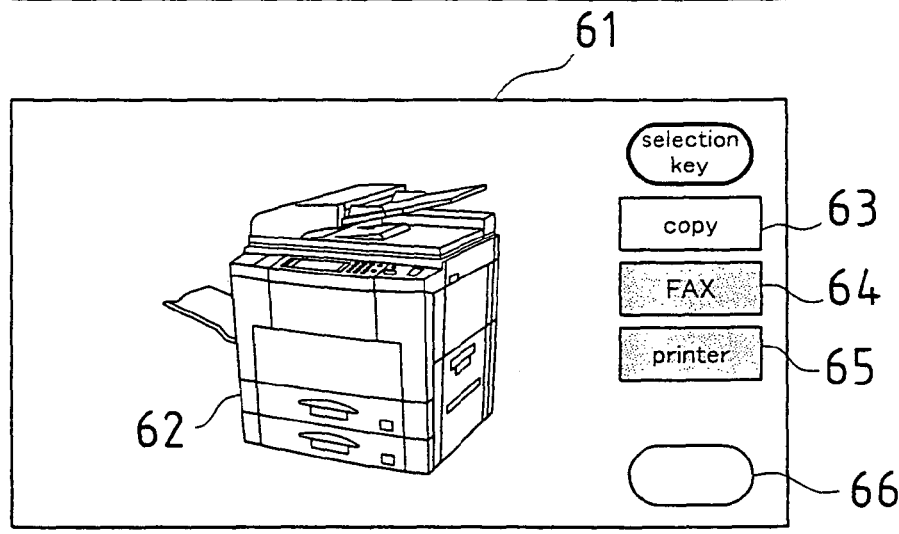
(c) 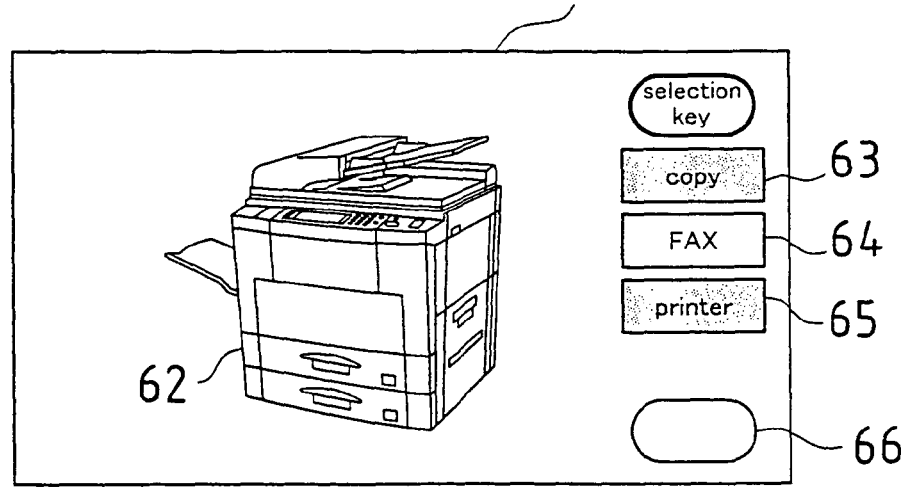

DISPLAY DEVICE OF ELECTRONIC APPARATUS

This application is the US national phase of international application PCT/JP2004/004883, filed 2 Apr. 2004, which designated the U.S. and claims priority of JP 2003-100569, filed 3 Apr. 2003, the entire contents of each of which are hereby incorporated by reference.

TECHNICAL FIELD

The present technology relates to a display device of an electronic apparatus which displays a plurality of conditions required for the electronic apparatus to perform a process and through which each condition is set through an input operation.

BACKGROUND ART

For many electronic apparatuses, conditions required to perform a process thereof are input and set on an entry screen of a display device. The user of such electronic apparatuses can perform an input operation quickly while referencing the entry screen of the display device.

Further, in some electronic apparatuses, a transparent touch panel is provided on the screen of the display device, and the touch panel detects a button or a key on the screen which is specified by touch with a tip of a finger or the like, thereby improving operability.

Furthermore, in recent years, as the electronic apparatus is equipped with more functions, the operation becomes more complicated. Therefore, a plurality of entry screens are hierarchically organized and are displayed on a display device for respective hierarchical levels separately, thereby facilitating an input operation.

For example, some image forming devices and the like, such as copiers, facsimile devices, printers, multifunction machines, and the like, are provided with a display device, such as a liquid crystal display panel or the like, and a transparent touch panel provided on the screen of the display device so that the touch panel detects a button or a key on the screen which is specified by touch with a tip of a finger or the like, thereby facilitating an input operation. In some devices, printing conditions, such as the size of printing paper, a print enlargement/reduction ratio, the number of copies, print density, and the like, can be arbitrarily set, and an entry screen for selecting these printing conditions and entry screens for setting the printing conditions are hierarchically organized and are displayed on a display device for respective hierarchical levels separately, so that the printing conditions are input and set on the entry screen (e.g., JP H11-134160 A).

However, conventionally, a number of entry screens hierarchically organized are sequentially displayed on a display device, and settings are input on each entry screen, and the user is not informed of to what degree conditions remain to be set (entry screens not yet entered) partway through all conditions. Therefore, the user does not know how long to continue input operations, resulting in an impression that the electronic apparatus is difficult to operate.

The technology is provided to solve the above-described problems. An is to provide a display device of an electronic apparatus which can inform of to what degree conditions remain to be set.

DISCLOSURE OF THE TECHNOLOGY

To solve the above-described problems, the technology provides a display device of an electronic apparatus for setting a plurality of conditions for a process of the electronic apparatus through an input operation while displaying the conditions before the electronic apparatus performs the process in accordance with the conditions, the device comprising determining means for determining whether or not each of the conditions has not yet been set, and display control means for displaying notifying information indicating to what degree conditions remain to be set.

According to the technology thus constructed, when setting each condition for the process through an input operation while displaying the condition, notifying information indicating to what degree conditions remain to be set is displayed. For example, entry screens corresponding to the respective conditions are hierarchically organized, and when the conditions are set through an input operation while the entry screens are displayed in sequence, notifying information indicating to what degree conditions remain to be set (entry screens not yet entered) is displayed. Thereby, it is possible to know how long to continue input operations.

The notifying information indicating to what degree conditions remain to be set is the number of conditions which have not yet been set.

Thus, the number of conditions which have not yet been set may be displayed. Instead of displaying this number, the number of conditions which have not yet been set may be displayed using a graph, or the ratio of the number of conditions which have already been set to the number of conditions which have not yet been set may be displayed using a graph.

Further, when the number of conditions which have not yet been set, the number being displayed by the display control means, reaches 0, performance of the process is started.

Thus, if the process is started when the number of conditions which have not yet been set reaches 0, i.e., all the conditions for the process have been set, the setting of the conditions can be immediately transitioned to the performance of the process.

Further, information for prompting an operation for starting performance of the process is provided when the number of conditions which have not yet been set reaches 0, the number being displayed by the display control means.

Thus, if information for prompting an operation for commanding start of performance of the process is provided when the number of conditions which have not yet been set reaches 0, i.e., all the conditions for the process have been set, the performance of the process can be commanded with appropriate timing.

Further, after items of the conditions are displayed, the notifying information indicating to what degree conditions remain to be set is represented by switching a method of displaying each of the items of the conditions, depending on whether or not the item of the condition has already been set.

For example, the items of the conditions may be displayed, and a display color of each of the items of the conditions is switched, depending on whether or not the item of the condition has been set. Alternatively, a display density of the item of the condition may be switched.

Further, performance of the process is started when the display control means uses the displaying method to display that all the items of the conditions have already been set. Alternatively, information for prompting an operation for starting performance of the process is provided when the display control means uses the displaying method to display that all the items of the conditions have already been set.

Thus, if performance of the process is started when the displaying method displays that all the items of the conditions have already been set, the setting of the conditions can be quickly transitioned to the performance of the process.

Further, the conditions are set through an input operation to be either one of a default content and an arbitrary content.

Thus, if the conditions can be set selectively to be either one of a default content and an arbitrary content, the operation is facilitated.

Further, a touch panel for inputting the conditions is provided on a display screen.

Thus, if the touch panel is provided, the input operation of the conditions can be easily performed on the entry screen.

BRIEF DESCRIPTION OF DRAWINGS

FIGS. 8(a), 8(b), and 8(c) are diagrams illustrating transition of mode selection screens displayed on a liquid crystal display panel of the image forming device of FIG. 1.

DESCRIPTION OF THE TECHNOLOGY

Hereinafter, embodiments of the technology will be described in detail with reference to the accompanying drawings.

Figure 1:
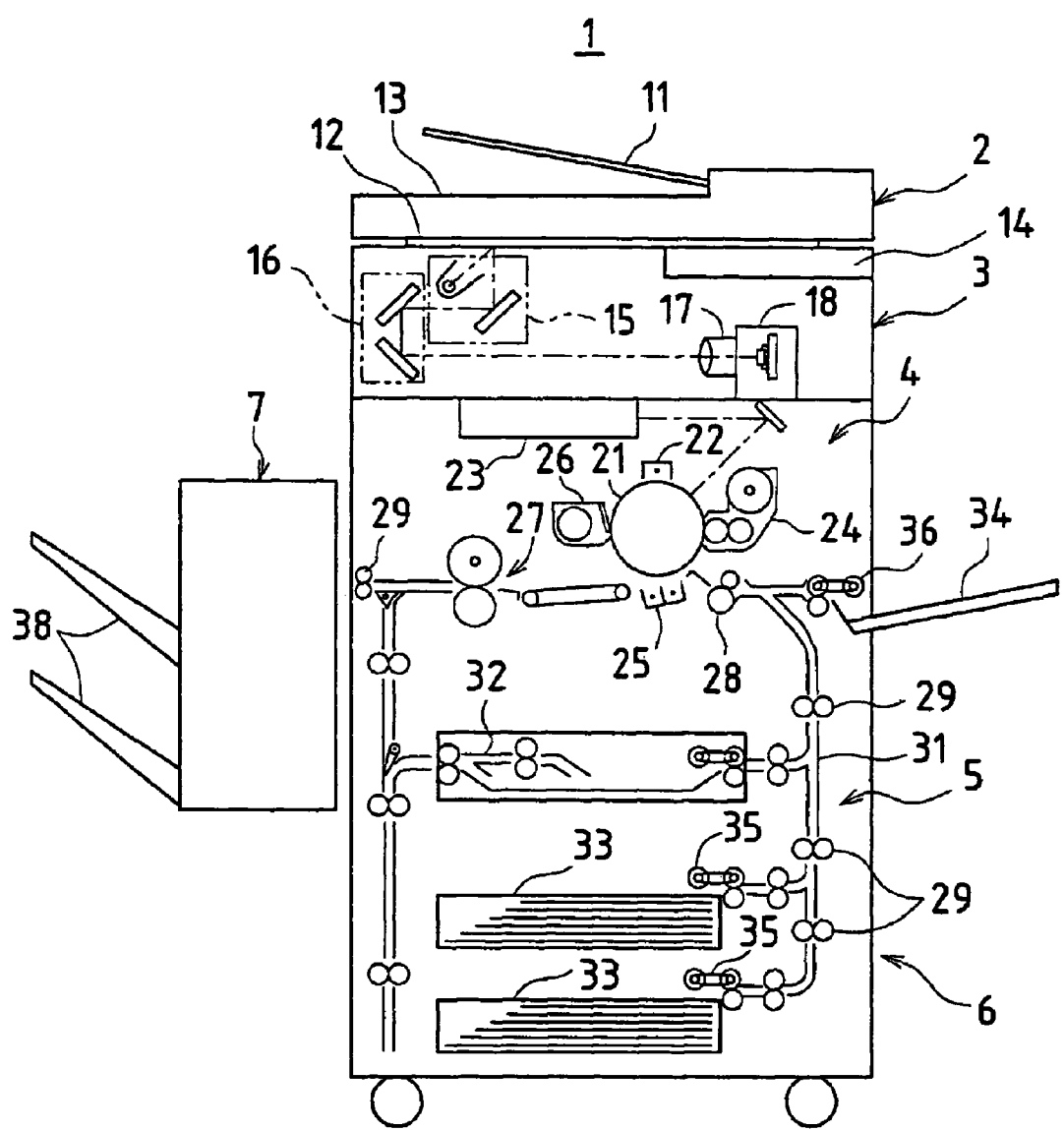
FIG. 1 is a side view illustrating an image forming device to which a display device is applied.

FIG. 1 is a side view illustrating an image forming device to which a display device is applied. The image forming device 1 can be selectively operated in a copier mode in which an image of an original is read and is then printed on printing paper, a facsimile mode in which an image of an original is read and is then transmitted or an image is received and is then printed on printing paper, a printer mode in which an image is received through a network from an information terminal device and is then printed on printing paper, or the like. The image forming device 1 has a structure which is roughly divided to a original transport portion 2, a read portion 3, a print portion 4, a printing paper transport portion 5, a paper supply portion 6, and a discharge portion 7.

Next, an operation of the image forming device 1 will be described, illustrating the copier mode.

Initially, an original is set in an original set tray 11 of the original transport portion 2, and thereafter, by operating an operation panel 14 of the read portion 3, the size of printing paper, a print enlargement/reduction ratio, the number of copies, print density, and the like are set. Thereafter, start of copying is commanded by operating the operation panel 14.

In response to this, the original transport portion 2 pulls out originals on a sheet-by-sheet basis from the original set tray 11, transports the original in a sub-scanning direction on a platen glass 12 of the read portion 3, and transports the original to an original discharge tray 13.

In the read portion 3, when the original is transported in the sub-scanning direction, the original is exposed by a first scanning unit 15, light reflected from the original is guided to an imaging lens 17 by first and second scanning units 15 and 16, and an image of the original is imaged on a photoelectric conversion element (hereinafter referred to as a CCD) 18 by the imaging lens 17. The CCD 18 repeatedly scans and reads the image of the original in a main-scanning direction, and outputs image data indicating the image of the original.

Alternatively, after an original is set on the platen glass 12, the size of printing paper, a print enlargement/reduction ratio, the number of copies, print density, and the like are set by operating the operation panel 14, and further, start of copying is commanded by operating the operation panel 14.

In the read portion 3, the first and second scanning units 15 and 16 are moved in the sub-scanning direction while maintaining a predetermined mutual velocity relationship. By the first scanning unit 15, the original on the platen glass 12 is exposed, light reflected from the original is guided to the imaging lens 17 by the first and second scanning units 15 and 16, and the image of the original is imaged on the CCD 18 by the imaging lens 17. The CCD 18 reads the image of the original and outputs image data indicating the image of the original.

The image data output by the CCD 18 is subjected to various image processes by a computation circuit (not shown), such as a microcomputer or the like, before being output to the print portion 4.

The print portion 4 prints the image of the original indicated by the image data onto printing paper. The print portion 4 comprises a photosensitive drum 21, a charging unit 22, a laser scanning unit (hereinafter referred to as an LSU) 23, a development unit 24, a transfer unit 25, a cleaning unit 26, a charge removal unit (not shown), a fixing unit 27, and the like. The photosensitive drum 21 is rotated in one direction. A surface of the photosensitive drum 21 is cleaned by the cleaning unit 26 and the charge removal unit before being uniformly charged by the charging unit 22. The laser scanning unit 23 modulates laser light, depending on the image data. The laser light is used to repeatedly scan the surface of the photosensitive drum 21 in the main-scanning direction, thereby forming an electrostatic latent image on the surface of the photosensitive drum 21. The development unit 24 supplies a toner onto the surface of the photosensitive drum 21 to develop the electrostatic latent image, thereby forming a toner image on the surface of the photosensitive drum 21. The transfer unit 25 transfers the toner image on the surface of the photosensitive drum 21 to printing paper transported by the printing paper transport portion 5. The fixing unit 27 applies heat and pressure to the printing paper to fix the toner image on the printing paper. Thereafter, the printing paper is further transported to the discharge portion 7 by the printing paper transport portion 5.

The printing paper transport portion 5 comprises a PS roller pair 28, a plurality of transporting roller pairs 29, a transport path 31, and a reversing transport path 32, and the like for transporting printing paper. The transport path 31 receives printing paper from the paper supply portion 6 and transports the printing paper to the print portion 4, and further, transports the printing paper to the discharge portion 7. The reversing transport path 32 receives the printing paper from the print portion 4 and reverses the two sides of the printing paper, and thereafter, transports the printing paper to the transport path 31 again. A plurality of detection switches for detecting passage of the printing paper are provided on the transport paths 31 and 32. Based on detection by each detection switch, timing of transporting the printing paper or the like is controlled.

The paper supply portion 6 holds unused printing paper and supplies the unused printing paper to the printing paper transport portion 5. The paper supply portion 6 comprises a paper supply cassette 33 and a manual tray 34. The paper supply cassette 33 holds printing paper sheets stacked therein. The pickup roller 35 pulls out printing paper sheet by sheet from the paper supply cassette 33, and the printing paper is transported. Printing paper is placed on the manual tray 34, is pulled out by a pickup roller 36, and is transported. After the printing paper is pulled out from the paper supply cassette 33 or the manual tray 34, when a leading edge of the printing paper reaches the PS roller pair 28, transportation of the printing paper is temporarily stopped. The leading edge of the printing paper is caused to be in parallel to the PS roller pair 28, and thereafter, the printing paper is transported by the PS roller pair 28 to the transfer unit 25 of the print portion 4.

The discharge portion 7 comprises a plurality of discharge trays 38. Printing paper is discharged to any one of the discharge trays 38, or a plurality of printing paper sheets are separately discharge to the discharge trays 38. Also, the discharge portion 7 may make a punch hole on printing paper or staple printing paper.

Figure 2:
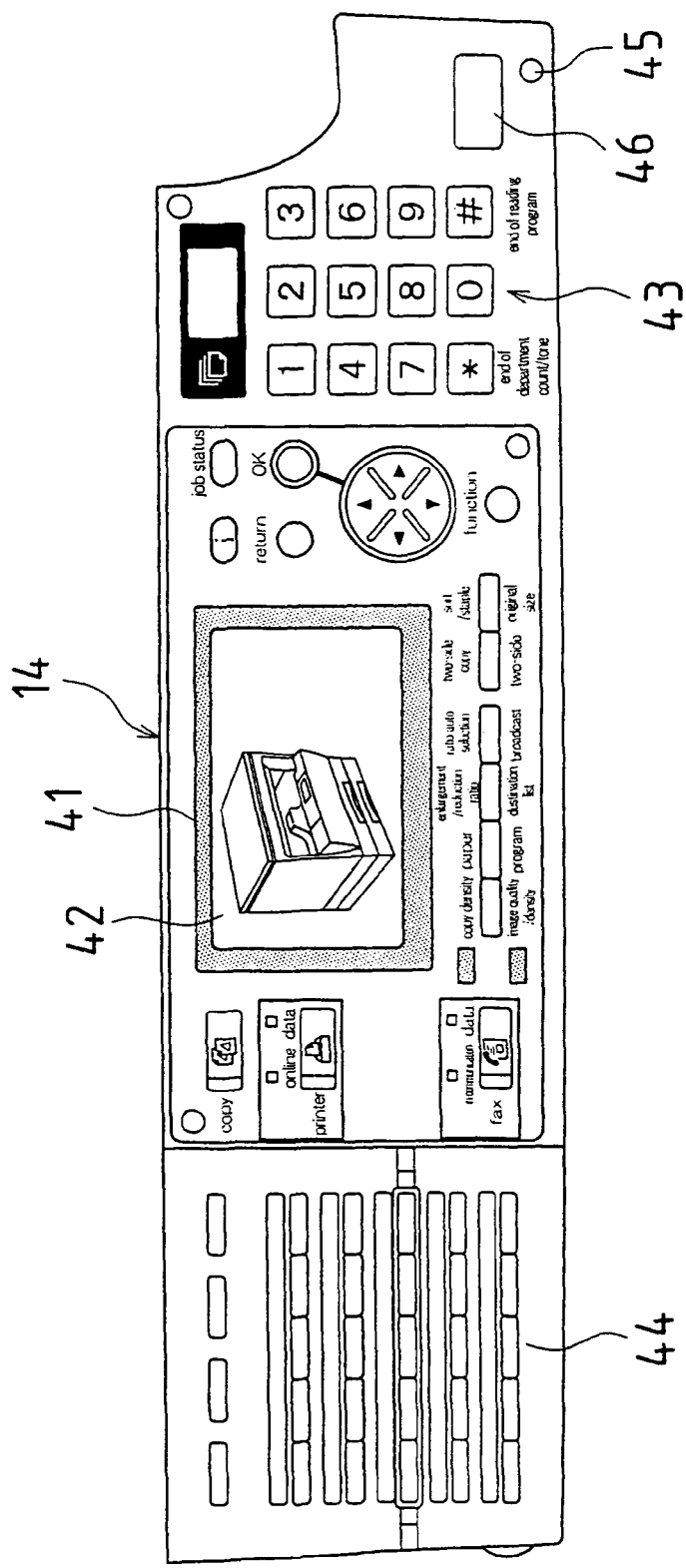
FIG. 2 is a plan view illustrating an operation panel in the image forming device of FIG. 1.

FIG. 2 is a plan view illustrating the operation panel 14 of the read portion 3. The operation panel 14 comprises a liquid crystal display panel 41, a transparent touch panel 42 provided on a screen of the liquid crystal display panel 41, a ten-key 43, a group of operation keys 44, and the like. The liquid crystal display panel 41 displays an entry screen for selecting printing conditions, such as the size of printing paper, a print enlargement/reduction ratio, the number of copies, print density, and the like, entry screens for setting the printing conditions, and the like. These entry screens are hierarchically organized and are displayed for respective hierarchical levels separately. The touch panel 42 is of a pressure-sensitive type, an electrostatic capacitance type, or the like, and detects an input position specified by touch with a tip of a finger, a tip of a pen, or the like on the screen of the liquid crystal display panel 41.

Note that a display device, such as a CRT, a plasma display, or the like, may be used instead of the liquid crystal display panel 41, or an electromagnetic-induction type touch panel on which a position is input using a pen may be used as the touch panel 42, for example.

Figure 3:
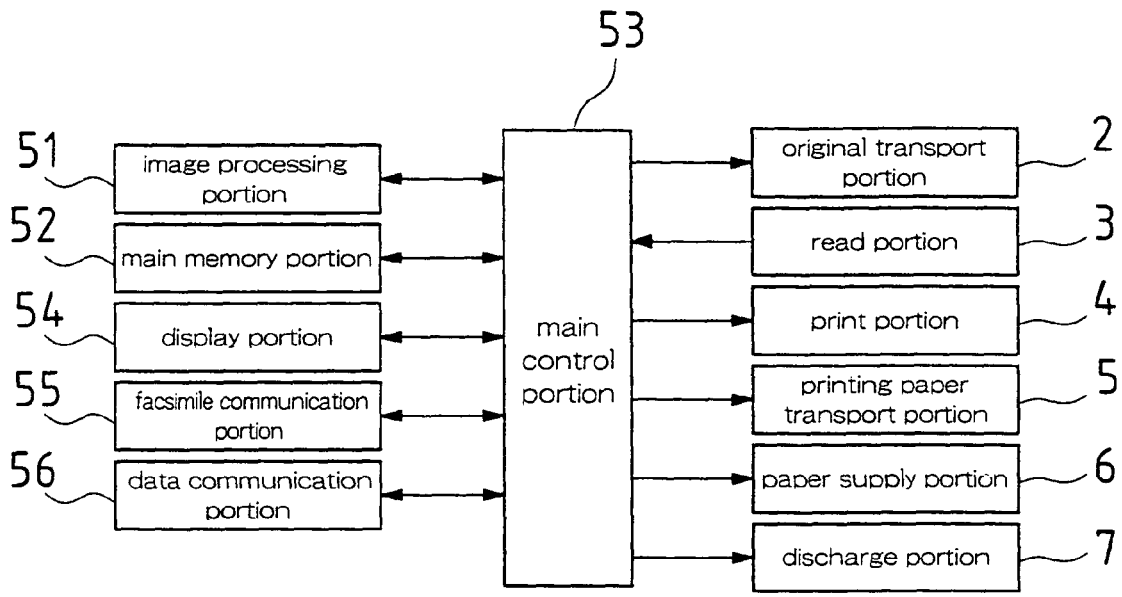
FIG. 3 is a block diagram illustrating a structure of the image forming device of FIG. 1.

FIG. 3 is a block diagram illustrating a structure of the image forming device 1. The image forming device 1 comprises an image processing portion 51, a main memory portion 52, a main control portion 53, a display portion 54, a facsimile communication portion 55, a data communication portion 56, and the like in addition to the original transport portion 2, the read portion 3, the print portion 4, the printing paper transport portion 5, the paper supply portion 6, and the discharge portion 7 which are described above.

The image processing portion 51 processes image data output by the CCD 18. Examples of image data processing performed by the image processing portion 51 include shading correction, density correction, area separation, filtering, MTF correction, resolution conversion, electronic zooming (scaling), gamma correction, and the like.

The main memory portion 52 stores unprocessed image data or processed image data, or stores various programs, data tables, or the like for image processing, various programs, data tables, or the like for operating the image forming device 1, and the like.

The main control portion 53 performs a centralized control of the image forming device 1. For example, the main control portion 53 controls the read portion 3, the print portion 4, the printing paper transport portion 5, the paper supply portion 6, the discharge portion 7, and the like.

The display portion 54 controls displaying of the liquid crystal display panel 41 of the operation panel 14 of FIG. 2, and detects inputs from the touch panel 42, the ten-key 43, and the operation key group 44.

The facsimile communication portion 55 transmits a call to an external terminal via a network and transmits image data to the external terminal, or receives an incoming call from an external terminal via a network and receives image data from the external terminal.

Figure 4:
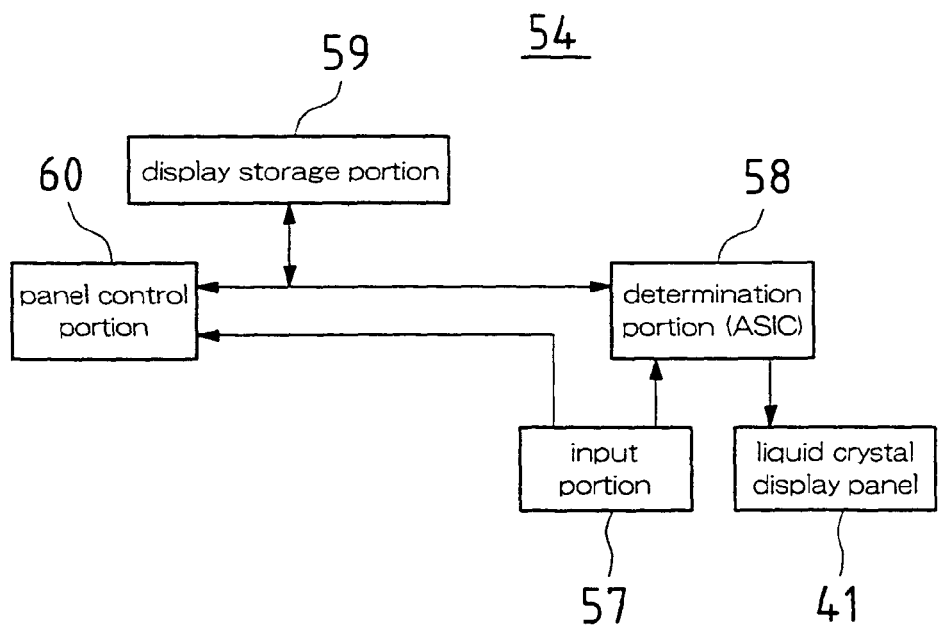
FIG. 4 is a block diagram illustrating a structure of a display portion of FIG. 3.

The data communication portion 56 receives image data from an external terminal via a LAN or the like. FIG. 4 is a block diagram illustrating a structure of the display portion 54. The display portion 54 comprises an input portion 57, a determination portion 58, a display storage portion 59, and a panel control portion 60 in addition to the liquid crystal display panel 41.

The input portion 57 comprises the touch panel 42, the ten-key 43, the operation key group 44, and the like of the operation panel 14.

The determination portion 58 is an ASIC (Application Specific Integrated Circuit). The determination portion 58 reads out display data from the display storage portion 59 in response to an input from the input portion 57 or a command from the panel control portion 60 and displays an image indicated by display data on the screen of the liquid crystal display panel 41. Also, when an input position specified by touch with a tip of a finger, a tip of a pen, or the like on the screen of the liquid crystal display panel 41 is detected by the touch panel 42 of the input portion 57, the determination portion 58 identifies an operation button or the like coinciding the input position on the screen.

The display storage portion 59 stores image data or the like of various images to be displayed on the liquid crystal display panel 41. Examples of these images include an entry screen for selecting printing conditions, such as the size of printing paper, a print enlargement/reduction ratio, the number of copies, print density, and the like, entry screens for setting the printing conditions, and the like.

The panel control portion 60 performs a centralized control of the display portion 54, and transmits and receives data to and from the main control portion 53 of FIG. 3.

In the thus-constructed image forming device 1, the operation panel 14 is operated to set various printing conditions, such as the size of printing paper, a print enlargement/reduction ratio, the number of copies, print density, and the like before copying an image of an original as described above. The entry screen for selecting the printing conditions and the entry screens for setting the respective printing conditions cannot be simultaneously displayed on the liquid crystal display panel 41. Therefore, these entry screens are hierarchically organized and are sequentially displayed so that input operations for the respective printing conditions can be sequentially performed.

Similarly, when facsimile communication is performed, entry screens corresponding to respective transmission conditions or reception conditions for facsimile are hierarchically organized and are sequentially displayed, so that input operations for the respective printing conditions can be sequentially performed.

Further, if the user does not know how long to continue input operations when the hierarchically organized entry screens are sequentially displayed, the user becomes anxious. Therefore, by displaying on the screen of the liquid crystal display panel 41 to what degree printing conditions remain to be set, the user is informed of how long to continue input operations.

Next, an outline of the process performed by the image forming device 1 will be described with reference to a flowchart illustrated in FIG. 5.

Initially, when the image forming device 1 is powered ON (step S1001), the original transport portion 2, the read portion 3, the print portion 4, the printing paper transport portion 5, the paper supply portion 6, the discharge portion 7, and the like of the image forming device 1 are initialized and are started to be warmed up (step S1002). Thereafter, when the initialization and the warming up are completed, a ready lamp 45 of the operation panel 14 is turned ON ("Yes" in step S1003), so that the completion is recognized by the main control portion 53 (step S1004).

After completing the initialization and warming up of the image forming device 1, the main control portion 53 commands the panel control portion 60 of the display portion 54 to start displaying. In response to this, the panel control portion 60 reads out image data indicating, for example, a mode selecting screen 61 illustrated in FIG. 8(a) from the display storage portion 59, and displays the mode selecting screen 61 via the determination portion 58 on the liquid crystal display panel 41 (step S1005).

The mode selecting screen 61 displays an image forming device image 62. The mode selecting screen 61 also displays a copier mode button 63, a facsimile mode button 64, a printer mode button 65, and a determination key 66.

Here, if the user wants to select the copier mode, the user presses the copier mode button 63 and the determination key 66 in sequence as illustrated in FIG. 8(b). Similarly, if the user wants to select the facsimile mode, the user presses the facsimile mode button 64 and the determination key 66 in sequence as illustrated in FIG. 8(c). Also, if the user wants to select the printer mode, the user presses the printer mode button 65 and the determination key 66 in sequence (step S1006).

Note that a pressed button and key are indicated as being unfilled on the screen of the liquid crystal display panel 41.

For example, when the copier mode button 63 and the determination key 66 have been pressed in sequence, the determination portion 58 detects via the touch panel 42 that the copier mode button 63 and the determination key 66 have been pressed in sequence ("Yes" in step S1007), informs the panel control portion 60 of the detected matter, reads out image data indicating, for example, a copier mode entry screen 67 illustrated in FIG. 9(a) from the display storage portion 59, and displays the copier mode entry screen 67 via the determination portion 58 on the liquid crystal display panel 41 (step S1008). Thereafter, the display portion 54 selectively displays the copier mode entry screen 67 and entry screens in hierarchical layers lower than that of the entry screen 67. Printing conditions, such as the size of printing paper, a print enlargement/reduction ratio, the number of copies, print density, and the like, are separately set in the respective entry screens, and the main control portion 53 is informed of these printing conditions. Based on the printing conditions, the main control portion 53 sets operational contents of the original transport portion 2, the read portion 3, the print portion 4, the printing paper transport portion 5, the paper supply portion 6, the discharge portion 7, the image processing portion 51, and the like, and controls each of these portions 2 to 7 and 51 to read and print an image of an original (step S1009). Thereafter, the main control portion 53 returns to step S1005 and is brought into a ready state.

Figure 10:
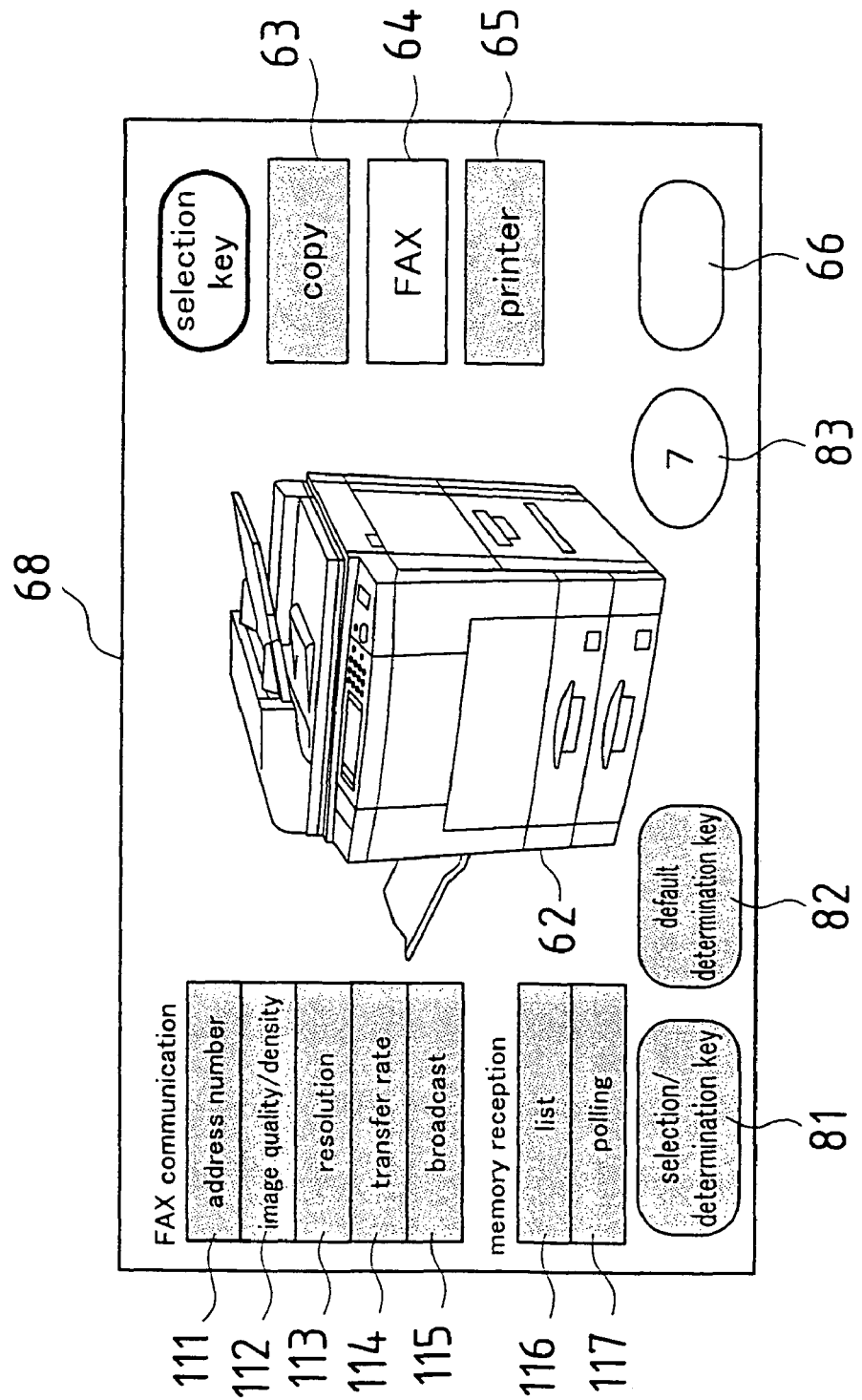
FIG. 10 is a diagram illustrating a facsimile mode entry screen displayed on the liquid crystal display panel of the image forming device of FIG. 1.

Also, when the facsimile mode button 64 and the determination key 66 have been pressed in sequence, the determination portion 58 detects via the touch panel 42 that the facsimile mode button 64 and the determination key 66 have been pressed in sequence ("No" in step S1007, "Yes" in step S1010), informs the panel control portion 60 of the detected matter, reads out image data indicating, for example, a facsimile mode entry screen 68 illustrated in FIG. 10 from the display storage portion 59, and displays the facsimile mode entry screen 68 via the determination portion 58 on the liquid crystal display panel 41 (step S1011). Thereafter, the display portion 54 selectively displays the facsimile mode entry screen 68 and entry screens in hierarchical layers lower than that of the entry screen 68. Transmission conditions or reception conditions for facsimile are separately set in the respective entry screens, and the main control portion 53 is informed of these conditions. Based on the transmission conditions or the reception conditions for facsimile, the main control portion 53 sets operational contents of the original transport portion 2, the read portion 3, the print portion 4, the printing paper transport portion 5, the paper supply portion 6, the discharge portion 7, the image processing portion 51, and the facsimile communication portion 55, and controls these portions 2 to 7, 51, and 55 to read an image of an original and transmit image data indicating the image or to receive image data and print an image indicated by the image data (step S1012). Thereafter, the main control portion 53 returns to step S1005 and is brought into the ready state.

Further, when the printer mode button 65 and the determination key 66 have been pressed in sequence, the determination portion 58 detects via the touch panel 42 that the printer mode button 65 and the determination key 66 have been pressed in sequence ("No" in step S1007, "No" in step S1010), informs the panel control portion 60 of the detected matter, reads out image data indicating a printer mode screen from the display storage portion 59, and displays the printer mode screen via the determination portion 58 on the liquid crystal display panel 41 (step S1013). In the printer mode, conditions are not set, as is different from in the copier mode or the facsimile mode. A simple message, such as "receiving data", "printing", or the like, is only displayed. Thereafter, when image data from an external terminal has been received by the data communication portion 56, an image indicated by the image data is printed (step S1014). Thereafter, the main control portion 53 returns to step S1005 and is brought into the ready state.

Next, the process of step S1009 in FIG. 5 will be described in greater detail.

It is assumed that the copier mode button 63 and the determination key 66 have been pressed in sequence and the copier mode entry screen 67 of FIG. 9(a) is displayed on the liquid crystal display panel 41 as described above. The copier mode entry screen 67 displays the mode selecting screen 61, and in addition, the image forming device image 62, the copier mode button 63, the facsimile mode button 64, the printer mode button 65, and the determination key 66, and further, an original placement position button 71, an number-of-originals button 72, an original size button 73, a printing paper button 74, an enlargement/reduction ratio button 75, a print density button 76, a number-of-copies button 77, a postprocess button selection 78, an discharge position button 79, a selection determination key 81, a default determination key 82, and a number-of-conditions-remaining-to-be-set field 83.

The original placement position button 71 corresponds to an entry screen for setting any one of the original set tray 11 of the read portion 3 and the platen glass 12 of the read portion 3 as a position where an original is to be placed. When the selection determination key 81 and the original placement position button 71 have been pressed in sequence, the entry screen is displayed on the liquid crystal display panel 41. The default position is the position of the platen glass 12. When the default determination key 82 and the original placement position button 71 have been pressed in sequence, the position of the platen glass 12 is set as a position where an original is to be placed, without displaying the entry screen.

The number-of-originals button 72 corresponds to an entry screen for setting the number of originals. When the selection determination key 81 and the number-of-originals button 72 have been pressed in sequence, the entry screen is displayed on the liquid crystal display panel 41. The default number of originals is one. When the default determination key 82 and the number-of-originals button 72 have been pressed in sequence, the number of originals is set to be one without displaying the entry screen.

The original size button 73 corresponds to an entry screen for setting the size of an original. When the selection determination key 81 and the original size button 73 have been pressed in sequence, the entry screen is displayed on the liquid crystal display panel 41. The default original size is A4. When the default determination key 82 and the original size button 73 have been pressed in sequence, the original size is set to be A4 without displaying the entry screen.

Figure 11:
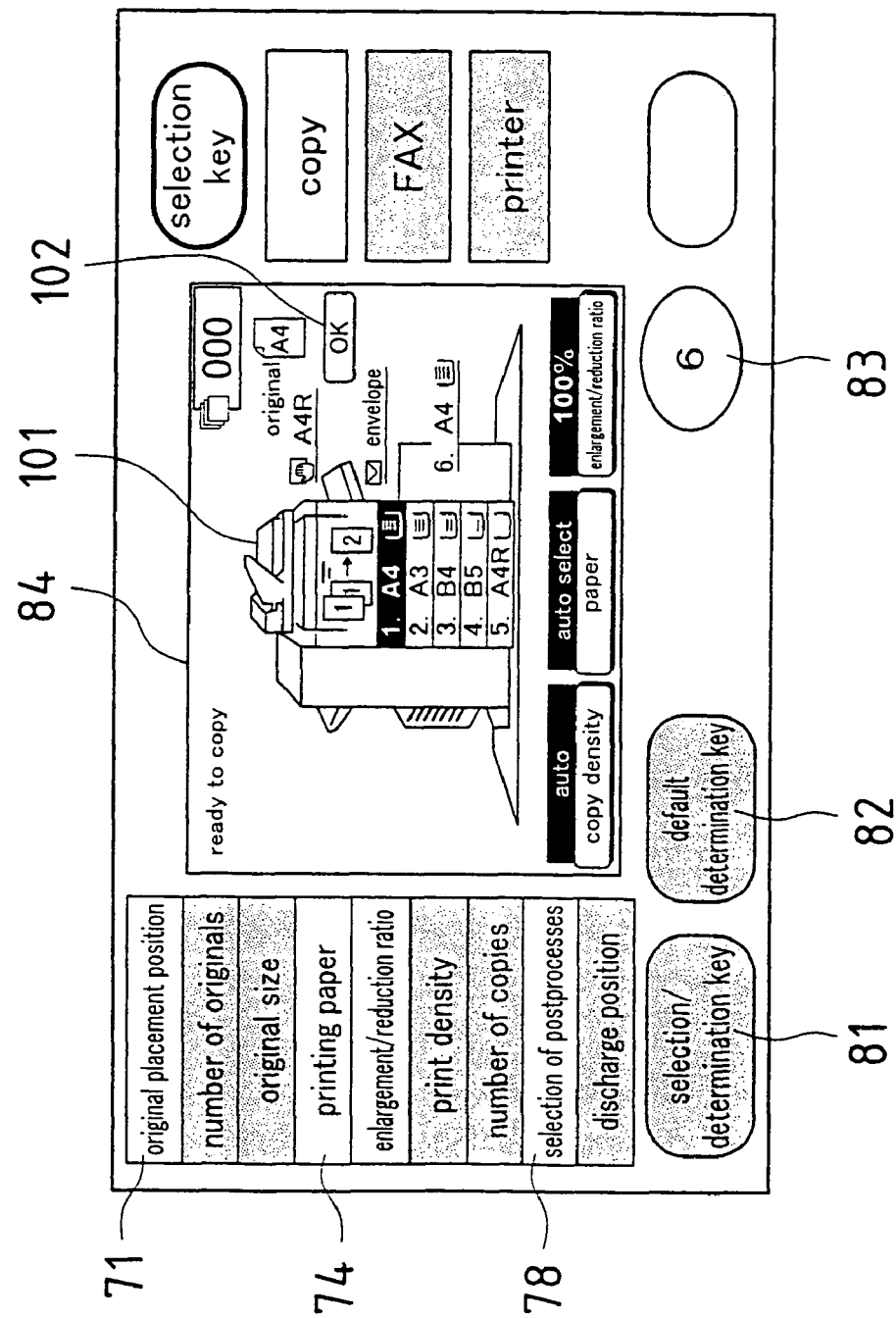
FIG. 11 illustrates an entry screen for setting the size of printing paper.

The printing paper button 74 corresponds to an entry screen for setting the size of printing paper. When the selection determination key 81 and the printing paper button 74 have been pressed in sequence, the entry screen is displayed on the liquid crystal display panel 41. The default size of printing paper is A4. When the default determination key 82 and the printing paper button 74 have been pressed in sequence, the size of printing paper is set to be A4 without displaying the entry screen. FIG. 11 illustrates an entry screen 84 for setting the size of printing paper through an input operation.

Figure 12:
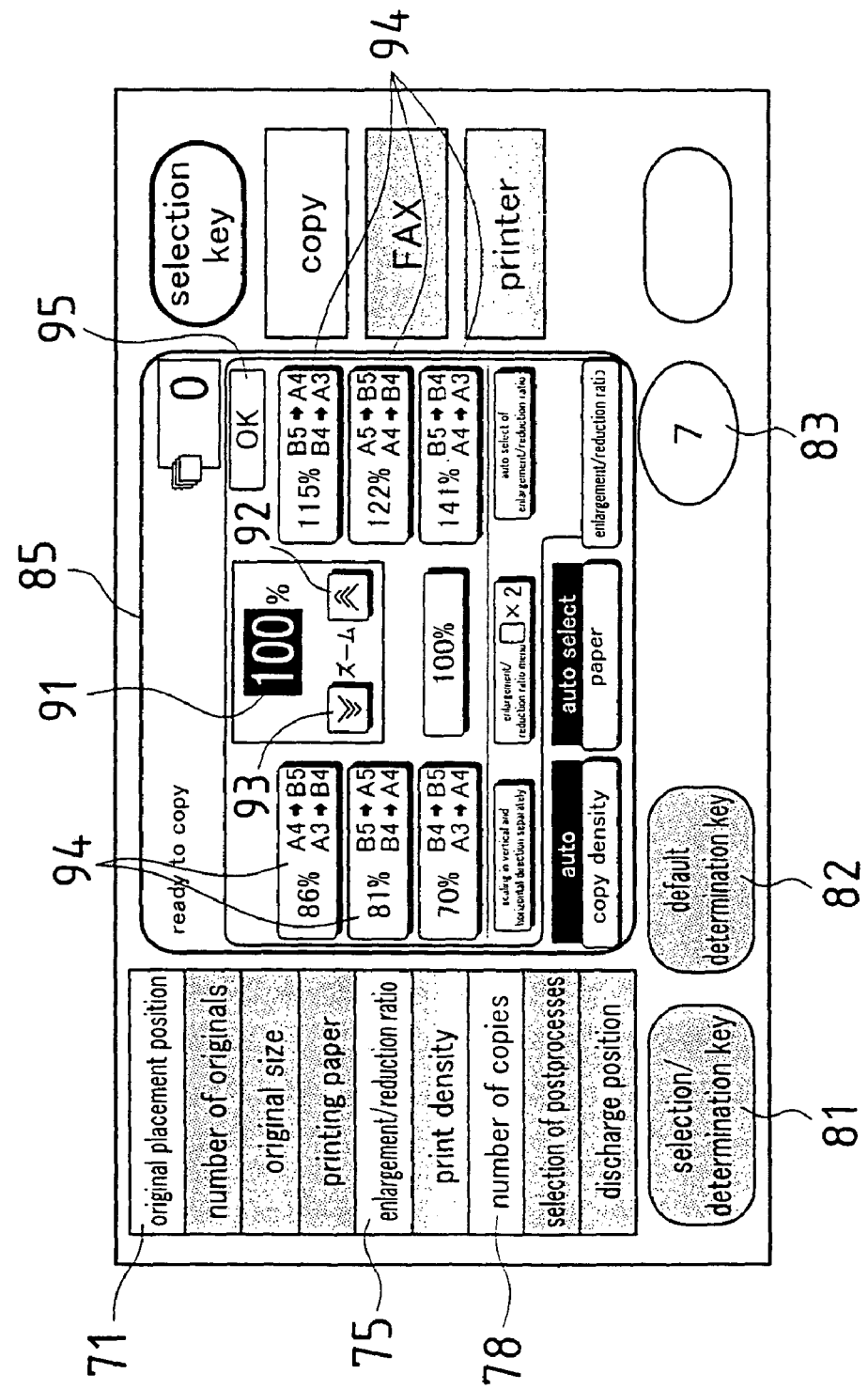
FIG. 12 illustrates an entry screen for setting a print enlargement/reduction ratio.

The enlargement/reduction ratio button 75 corresponds to an entry screen for setting the print enlargement/reduction ratio of an image of an original. When the selection determination key 81 and the enlargement/reduction ratio button 75 have been pressed in sequence, the entry screen is displayed on the liquid crystal display panel 41. The default print enlargement/reduction ratio is 100% (equal size). When the default determination key 82 and the enlargement/reduction ratio button 75 have been pressed in sequence, the print enlargement/reduction ratio is set to be 100% without displaying the entry screen. FIG. 12 illustrates an entry screen 85 for setting a print enlargement/reduction ratio through an input operation.

The print density button 76 corresponds to an entry screen for setting print density. When the selection determination key 81 and the print density button 76 have been pressed in sequence, the entry screen is displayed on the liquid crystal display panel 41. The default print density is set. When the default determination key 82 and the print density button 76 have been pressed in sequence, the default print density is set without displaying the entry screen.

The number-of-copies button 77 corresponds to an entry screen for setting the number of copies. When the selection determination key 81 and the number-of-copies button 77 have been pressed in sequence, the entry screen is displayed on the liquid crystal display panel 41. The default number of copies is one. When the default determination key 82 and the number-of-copies button 77 have been pressed in sequence, the number of copies is set to be one without displaying the entry screen.

Figure 13:
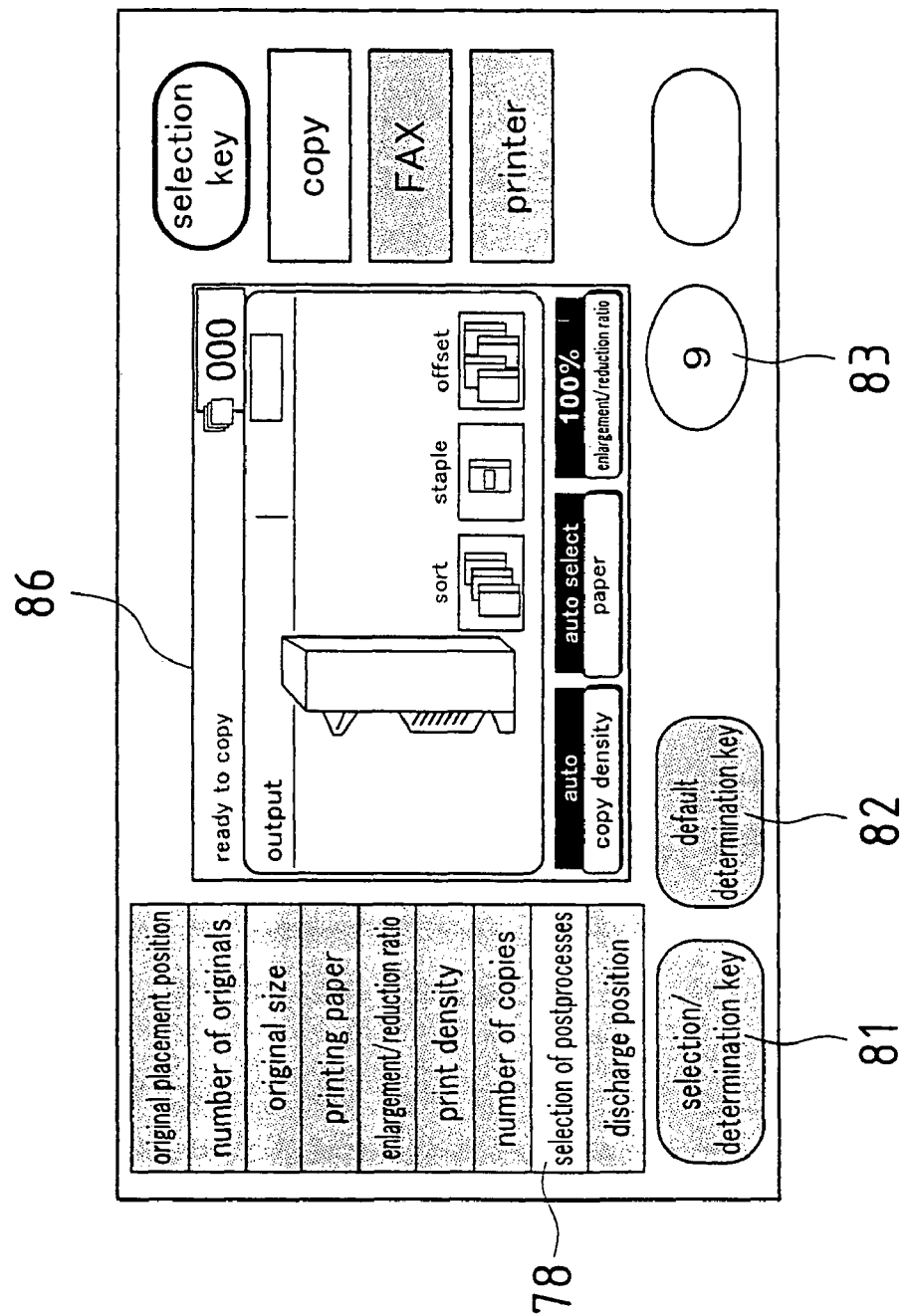
FIG. 13 illustrates an entry screen for setting a postprocess of printing paper.

The postprocess button selection 78 corresponds to an entry screen for setting a postprocess of printing paper. When the selection determination key 81 and the postprocess button selection 78 have been pressed in sequence, the entry screen is displayed on the liquid crystal display panel 41. It is a default that no postprocess is performed. When the default determination key 82 and the postprocess button selection 78 have been pressed in sequence, the default that no postprocess is performed is set without displaying the entry screen. FIG. 13 illustrates an entry screen 86 for setting a postprocess of printing paper through an input operation.

The discharge position button 79 corresponds to an entry screen for setting any one of the discharge trays 38 of the discharge portion 7 as a position where printing paper is to be discharged. When the selection determination key 81 and the discharge position button 79 have been pressed in sequence, the entry screen is displayed on the liquid crystal display panel 41. The default position is an uppermost discharge tray 38. When the default determination key 82 and the discharge position button 79 have been pressed in sequence, the uppermost discharge tray 38 is set as a position where printing paper is to be discharged, without displaying the entry screen.

Note that the entry screens corresponding to the respective buttons 71 to 79 are stored in the form of image data in the display storage portion 59. Default contents corresponding to the respective buttons 71 to 79 are also stored in the display storage portion 59.

Figure 5:
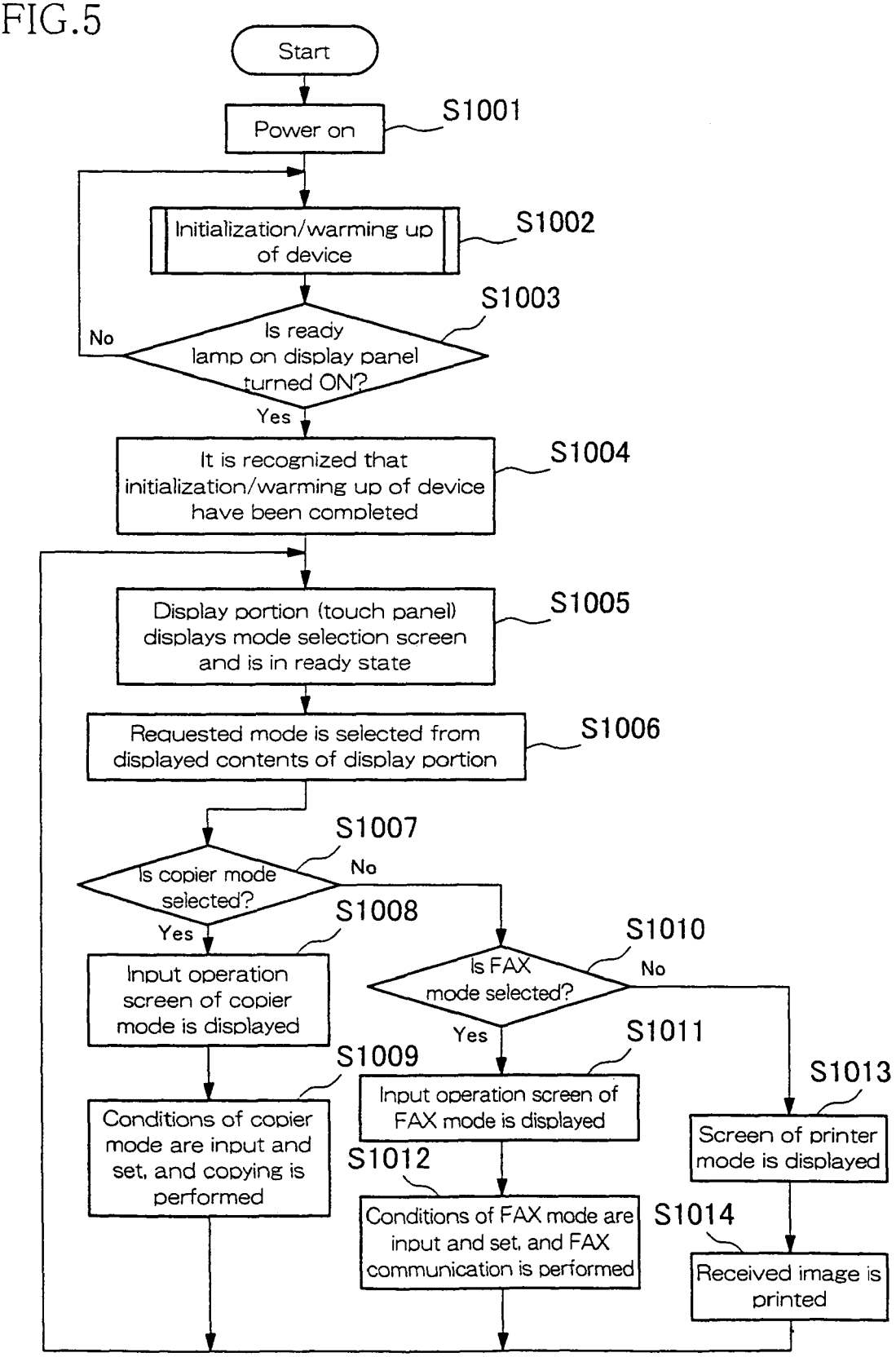
FIG. 5 is a flowchart schematically illustrating a process performed by the image forming device of FIG. 1.
Figure 6:
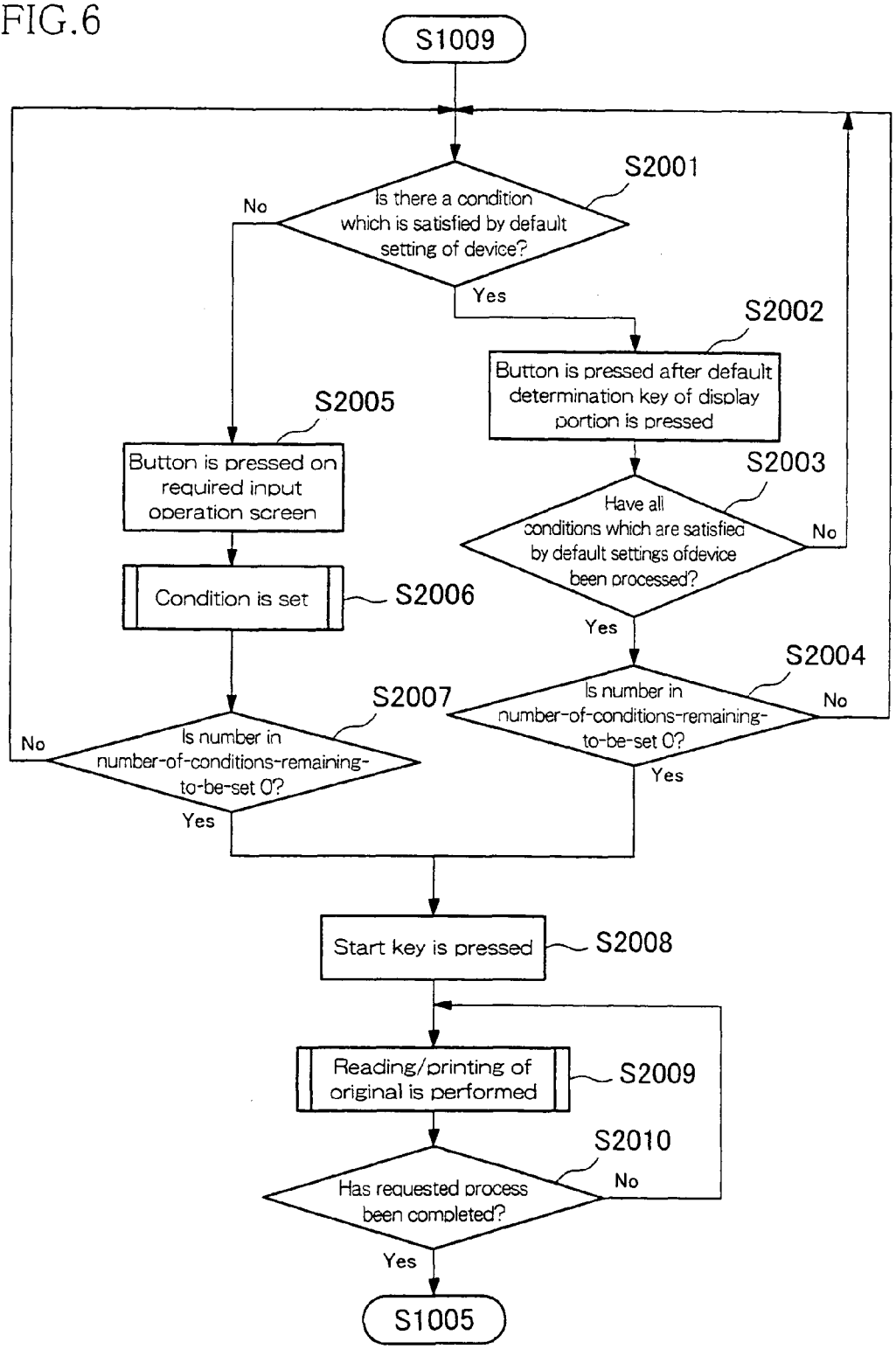
FIG. 6 is a flowchart illustrating a process of step S1009 of FIG. 5 in greater detail.

FIG. 6 is a flowchart illustrating the process of step S1009 of FIG. 5 in greater detail.

Here, it is assumed that none of the buttons 71 to 79, the selection determination key 81, the default determination key 82, and the number-of-conditions-remaining-to-be-set field 83 on the copier mode entry screen 67 of FIG. 9(a) have been pressed. In this case, the number-of-conditions-remaining-to-be-set field 83 displays a number 9 which is the number of the buttons 71 to 79 which have not yet been pressed.

In this situation, the user presses either one of the selection determination key 81 and the default determination key 82 (step S2001). For example, if the default determination key 82 has been pressed ("Yes" in step S2001), then at least one of the buttons 71 to 79 is pressed (step S2002). For example, as illustrated in FIG. 9(b), the default determination key 82 is pressed, and following this, the original placement position button 71 and the postprocess button selection 78 are pressed (step S2002). The determination portion 58 detects via the touch panel 42 that the default determination key 82, the original placement position button 71, and the postprocess button selection 78 have been pressed in sequence, and informs the panel control portion 60 of the detected matter. In response to this, the panel control portion 60 reads out the platen glass 12 (the default position) from the display storage portion 59 and sets it, and also reads out the default setting that no postprocess is performed, from the display storage portion 59, and sets it.

Also, since the buttons 71 and 78 have been pressed, the determination portion 58 displays a number 7 which is the number of the buttons 72 to 77 and 79 which have not yet been pressed, in the number-of-conditions-remaining-to-be-set field 83 as illustrated in FIG. 9(c) to update the number in the number-of-conditions-remaining-to-be-set field 83.

In this case, as illustrated in FIG. 9(c), the buttons 71 and 78 which have already been pressed are displayed as being unfilled, and the number 7 which is the number of the buttons 72 to 77 and 79 which have not yet been pressed is displayed in the number-of-conditions-remaining-to-be-set field 83. Therefore, by viewing the screen of the liquid crystal display panel 41, the number and types of printing conditions which have not yet been set can be known.

Thereafter, since the other buttons 72 to 77 and 79 which may set the default contents remain ("No" in step S2003), the process returns to step S2001. Also, since the number 7 indicated by the number-of-conditions-remaining-to-be-set field 83 is not 0 ("No" in step S2004), the process returns to step S2001.

Note that the number of some of the buttons 71 to 79 to be pressed following the default determination key 82 may be increased or decreased, or all the buttons 71 to 79 may be pressed. In either case, after the default determination key 82 and a button is pressed, button(s) which have not yet been pressed are indicated as being unfilled, and the number of buttons which have not yet been pressed is displayed in the number-of-conditions-remaining-to-be-set field 83. Therefore, the number and types of printing conditions which have not yet been set can be known.

Figure 9:
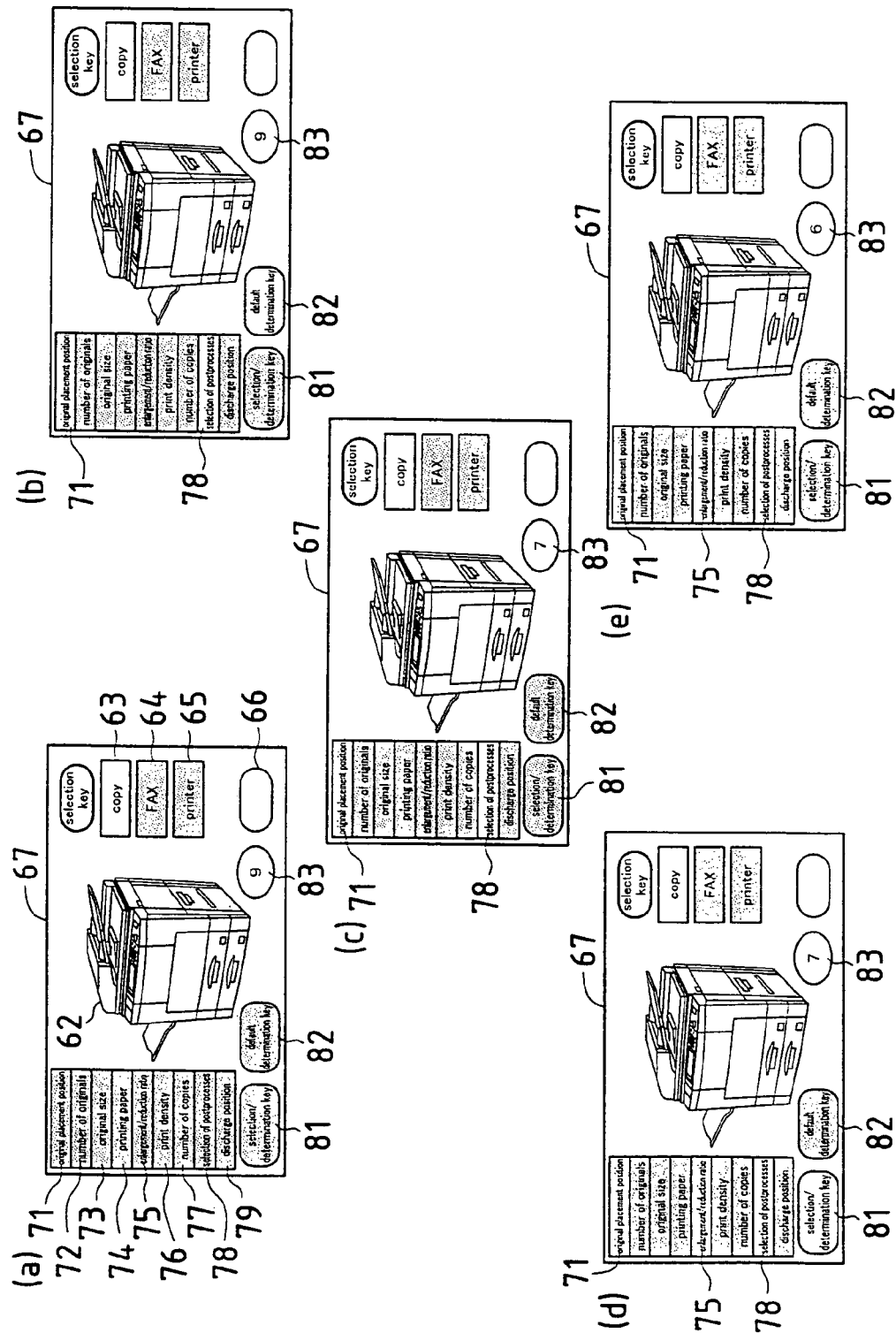
FIGS. 9(a) to 9(e) are diagrams transition of a copier mode entry screen displayed on the liquid crystal display panel of the image forming device of FIG. 1.

Next, for example, the user presses the selection determination key 81 as illustrated in FIG. 9(*d*) ("No" in step S2001), and following this, presses the enlargement/reduction ratio button 75 (step S2005). The determination portion 58 detects via the touch panel 42 that the selection determination key 81 and the enlargement/reduction ratio button 75 have been pressed in sequence, and reads out image data indicating the entry screen 85 of FIG. 12 from the display storage portion 59 and displays the entry screen 85 on the liquid crystal display panel 41.

As can be seen from FIG. 12, the entry screen 85 displays a print enlargement/reduction ratio field 91 for displaying a print enlargement/reduction ratio, an increment button 92 and a decrement button 93 for specifying an arbitrary print enlargement/reduction ratio, print enlargement/reduction ratio buttons 94 for specifying default print enlargement/reduction ratios, an OK button 95, and the like.

In this situation, for example, the user presses the increment button 92 or the decrement button 93. When the determination portion 58 detects via the touch panel 42 that the increment button 92 or the decrement button 93 has been pressed, a print enlargement/reduction ratio in the print enlargement/reduction ratio field 91 of the entry screen 85 is changed, i.e., increased or decreased. Alternatively, when any one of the print enlargement/reduction ratio buttons 94 has been pressed, the determination portion 58 detects a pressed print enlargement/reduction ratio button 94 via the touch panel 42, and displays the print enlargement/reduction ratio of the pressed print enlargement/reduction ratio button 94 in the print enlargement/reduction ratio field 91 of the entry screen 85. After the user causes the print enlargement/reduction ratio field 91 of the entry screen 85 to display a desired print enlargement/reduction ratio, the user presses the OK button 95. In response to this, the determination portion 58 informs the panel control portion 60 of the print enlargement/reduction ratio in the print enlargement/reduction ratio field 91. The panel control portion 60 sets the print enlargement/reduction ratio (step S2006).

Since the enlargement/reduction ratio button 75 has been pressed, the determination portion 58 displays a number 6 which is the number of the buttons 72 to 74, 76, 77, and 79 which have not yet been pressed, in the number-of-conditions-remaining-to-be-set field 83 as illustrated in FIG. 9(*e*) to update the number in the number-of-conditions-remaining-to-be-set field 83.

In this case, as illustrated in FIG. 9(*e*), the buttons 71, 75, and 78 which have already been pressed are indicated as being unfilled, and the number 6 which is the number of the buttons 72 to 74, 76, 77, and 79 is displayed in the number-of-conditions-remaining-to-be-set field 83. Therefore, by viewing the screen of the liquid crystal display panel 41, the number and types of printing conditions which have not yet been set can be known.

Thereafter, since the number 6 indicated in the number-of-conditions-remaining-to-be-set field 83 is not 0 ("No" in step S2007), the process returns to step S2001 and the copier mode entry screen 67 is displayed.

Next, for example, the user presses the selection determination key 81 ("No" in step S2001), and following this, presses the printing paper button 74 (step S2005). The determination portion 58 detects via the touch panel 42 that the selection determination key 81 and the printing paper button 74 have been pressed in sequence, reads out image data indicating the entry screen 84 of FIG. 11 from the display storage portion 59, and displays the entry screen 84 on the liquid crystal display panel 41.

As illustrated in FIG. 11, the entry screen 84 displays size buttons 101, an OK button 102, and the like for specifying the size of printing paper.

In this situation, for example, the user presses any one of the size buttons 101, and following this, presses the OK button 102. The determination portion 58, when detecting a pressed size button 101, changes the display density of the pressed size button 101, and following this, when detecting the pressed OK button 102, informs the panel control portion 60 of the size of printing paper of the pressed size button 101. The panel control portion 60 sets the size of printing paper (step S2006).

Since the printing paper button 74 has been pressed, the determination portion 58 displays a number 5 which is the number of the buttons 72, 73, 76, 77, and 79 which have not yet been pressed, in the number-of-conditions-remaining-to-be-set field 83 to update the number in the number-of-conditions-remaining-to-be-set field 83.

In this case, the buttons 71, 74, 75, and 78 which already have been pressed are displayed as being unfilled, and the number 5 which is the number of the buttons 72, 73, 76, 77, and 79 which have not yet been pressed is displayed in the number-of-conditions-remaining-to-be-set field 83.

Thereafter, since the number 5 displayed in the number-of-conditions-remaining-to-be-set field 83 is not 0 ("No" in step S2007), the process returns to step S2001, and the copier mode entry screen 67 is displayed.

Thereafter, similarly, step S2001 and thereafter are repeated. When the default determination key 82 and at least one button have been pressed in sequence on the copier mode entry screen 67, a default content indicating the button of a printing condition is read out from the display storage portion 59 and is set. Also, when the selection determination key 81 and a button have been pressed in sequence, an entry screen for setting the printing condition of the button is read out from the display storage portion 59 and is displayed, and an arbitrary content of the printing condition input on the entry screen is set. Thereafter, button(s) which have already been pressed are displayed as being unfilled, and the number of buttons which have not yet been pressed is displayed in the number-of-conditions-remaining-to-be-set field 83. Therefore, by viewing the screen of the liquid crystal display panel 41, the number and types of printing conditions which have not yet been set can be known.

Note that, after the printing condition of a button was set, this button can be pressed again, following the selection determination key 81 or the default determination key 82, to set the printing condition of the button again. Also in this case, step S2001 and thereafter are performed, so that the printing condition of the button is set to be the default content, or an arbitrary content of the printing condition is set on the entry screen of the button. Further, button(s) which have already been pressed is displayed as being unfilled, and the number of buttons which have not yet been pressed is displayed in the number-of-conditions-remaining-to-be-set field 83.

Eventually, when all the original placement position button 71, the number-of-originals button 72, the original size button 73, the printing paper button 74, the enlargement/reduction ratio button 75, the print density button 76, the number-of-copies button 77, the postprocess button selection 78, and the discharge position button 79 have been pressed, and all the printing conditions of the buttons 71 to 79 have been set, all the buttons 71 to 79 are displayed as being unfilled on the copier mode entry screen 67, and a number 0 is displayed in the number-of-conditions-remaining-to-be-set field 83 ("Yes" in step S2004 or S2007). Further, the panel control portion 60 informs the main control portion 53 of all the printing conditions. Based on the printing conditions, the main control portion 53 sets operational contents of the original transport portion 2, the read portion 3, the print portion 4, the printing paper transport portion 5, the paper supply portion 6, the discharge portion 7, the image processing portion 51, and the like.

In this case, since all the buttons 71 to 79 are displayed as being unfilled, and a number 0 is displayed in the number-of-conditions-remaining-to-be-set field 83, the user can know that all the printing conditions have been set. Thereafter, the user presses a start key 46 on the operation panel 14 to start copying (step S2008). The panel control portion 60 detects via the determination portion 58 that the start key 46 has been pressed, and informs the main control portion 53 of the detected matter. In response to this, the main control portion 53 controls the portions 2 to 7 and 51 to read and print an image of an original (step S2009). After confirming that the reading and printing of the image of the original have been completed ("Yes" in step S2010), the main control portion 53 returns to step S1005 and is brought into the ready state.

Note that step S2008 may be omitted. In this case, when all the buttons 71 to 79 are displayed as being unfilled, and 0 is displayed in the number-of-conditions-remaining-to-be-set field 83, the process is immediately transitioned to step S2009, and reading and printing of an image of an original are automatically started.

Next, step S1012 of FIG. 5 will be described in greater detail.

As described above, it is assumed that the facsimile mode button 64 and the determination key 66 have been pressed in sequence, so that the facsimile mode entry screen 68 of FIG. 10 is displayed on the liquid crystal display panel 41. The facsimile mode entry screen 68 displays the image forming device image 62, the copier mode button 63, the facsimile mode button 64, the printer mode button 65, and the determination key 66 as on the mode selecting screen 61, and in addition, an address number button 111, an image quality density button 112, a resolution button 113, a transfer rate button 114, a broadcast button 115, a list button 116, a polling button 117, the selection determination key 81, the default determination key 82, and the number-of-conditions-remaining-to-be-set field 83.

The buttons 111 to 117 are used to set transmission conditions and reception conditions for facsimile. Entry screens corresponding to the buttons 111 to 117 are stored in the form of image data in the display storage portion 59. Further, default contents corresponding to the buttons 111 to 117 are stored in the display storage portion 59.

Figure 7:
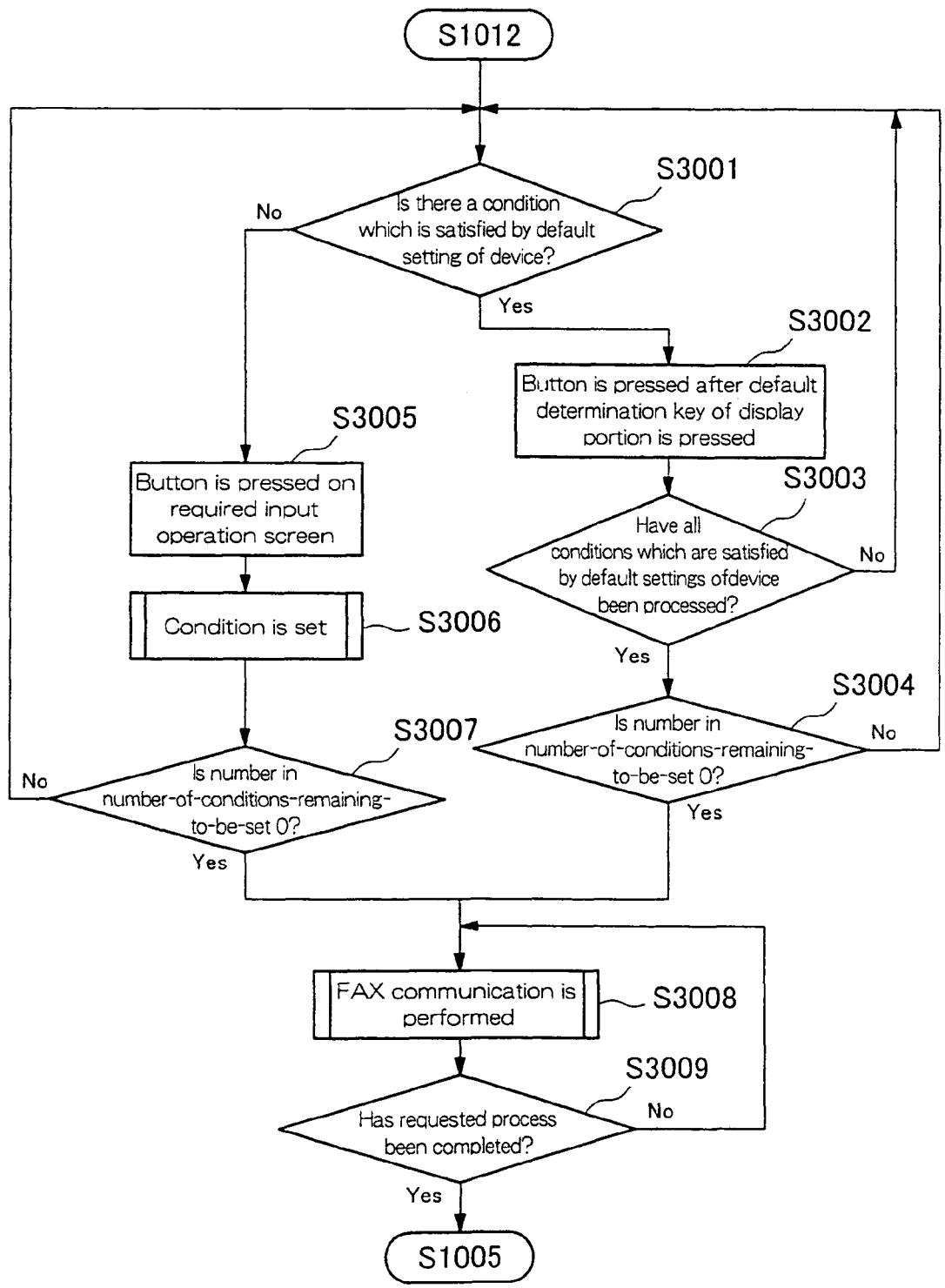
FIG. 7 is a flowchart illustrating a process of step S1012 of FIG. 5 in greater detail.

FIG. 7 is a flowchart illustrating the process of step S1009 of FIG. 5 in greater detail.

Here, it is assumed that none of the buttons 111 to 117, the selection determination key 81, the default determination key 82, and the number-of-conditions-remaining-to-be-set field 83 on the facsimile mode entry screen 68 of FIG. 10 have been pressed. In this case, the number-of-conditions-remaining-to-be-set field 83 displays a number 7 which is the number of the buttons 111 to 117 which have not yet been pressed.

In this situation, for example, the default determination key 82 is pressed ("Yes" in step S3001), and following this, at least one of the buttons 111 to 117 is pressed (step S3002). The determination portion 58 detects via the touch panel 42 that the default determination key 82 has been pressed, and following this, at least one button has been pressed, and informs the panel control portion 60 of the detected matter. In response to this, the panel control portion 60 reads out and sets a default content of the transmission condition or reception condition of the pressed button from the display storage portion 59.

In this case, the at least one button which has already been pressed is displayed as being unfilled, and the number of buttons which have not yet been pressed is displayed in the number-of-conditions-remaining-to-be-set field 83 to update the number in the number-of-conditions-remaining-to-be-set field 83.

Thereafter, if there is another button(s) for which a default content can be set ("No" in step S3003), the process returns to step S3001. Also, when the number displayed in the number-of-conditions-remaining-to-be-set field 83 is not 0 ("No" in step S3004), the process returns to step S3001.

Note that, the number of some of the buttons 111 to 117 to be pressed following the default determination key 82 may be increased, or all the buttons 111 to 117 may be pressed.

When the selection determination key 81 has been pressed ("No" in step S3001), and following this, any one of the buttons 111 to 117 has been pressed (step S3005), the determination portion 58 detects via the touch panel 42 that the selection determination key 81 and any one of the buttons 111 to 117 have been pressed in sequence, reads out image data indicating the entry screen of the pressed button from the display storage portion 59, and displays the entry screen on the liquid crystal display panel 41. Thereafter, a button, a key, or the like of the entry screen is selectively pressed to specify an arbitrary content of a transmission condition or a reception condition. The determination portion 58 detects the pressed button, key, or the like of the entry screen via the touch panel 42 to determine the arbitrary content of the transmission condition or the reception condition, and informs the panel control portion 60 of the arbitrary content of the transmission condition or the reception condition. The panel control portion 60 sets the arbitrary content of the transmission condition or the reception condition (step S3006).

In this case, button(s) which have already been pressed is displayed as being unfilled, and the number of buttons which have not yet been pressed is displayed in the number-of-conditions-remaining-to-be-set field 83 to update the number in the number-of-conditions-remaining-to-be-set field 83. Thereafter, if the number displayed in the number-of-conditions-remaining-to-be-set field 83 is not 0 ("No" in step S3007), the process returns to step S3001 and the facsimile mode entry screen 68 is displayed.

Thereafter, similarly, step S3001 and thereafter are repeated. The default determination key 82 and at least one button have been pressed in sequence on the facsimile mode entry screen 68, so that a default content of a transmission condition or a reception condition indicated by the button is read out from the display storage portion 59 and is set. When the selection determination key 81 and a button have been pressed in sequence, an entry screen for setting the transmission condition or reception condition of the button is read out from the display storage portion 59 and is displayed, and thereafter, an arbitrary content of the transmission condition or the reception condition input on the entry screen is set. Thereafter, button(s) which have already been pressed is displayed as being unfilled, and the number of buttons which have not yet been pressed is displayed in the number-of-conditions-remaining-to-be-set field 83. Therefore, by viewing the screen of the liquid crystal display panel 41, the number and types of transmission conditions or reception conditions which have not yet been set can be known.

Note that, after setting the transmission condition or reception condition of a button, the button can be pressed again, following the selection determination key 81 or the default determination key 82, to set the transmission condition or reception condition of the button. Also in this case, step S3001 and thereafter are performed so that the default content of the transmission condition or reception condition of a button is set, or an arbitrary content is set on an entry screen for setting the transmission condition or reception condition of a button.

Eventually, when all the buttons 111 to 117 have been pressed and all the transmission conditions or reception conditions of the buttons 111 to 117 have been set, all the buttons 71 to 79 are displayed as being unfilled, and 0 is displayed in the number-of-conditions-remaining-to-be-set field 83, on the facsimile mode entry screen 68 ("Yes" in step S3004 or S3007). Further, the panel control portion 60 informs the main control portion 53 of these conditions. Based on the conditions, the main control portion 53 sets operational contents of the original transport portion 2, the read portion 3, the print portion 4, the printing paper transport portion 5, the paper supply portion 6, the discharge portion 7, the image processing portion 51, and the facsimile communication portion 55 and controls the portions 2 to 7, 51, and 55 to read an image of an original and transmit image data indicating the image or to receive image data and print an image indicated by the image data (step S3008). After confirming that facsimile communication has been completed ("Yes" in step S3009), the main control portion 53 returns to step S1005 and is brought into the ready state.

Note that, after all the buttons 111 to 117 have been pressed and all the conditions of the buttons 111 to 117 have been set, pressing of the start key 46 on the operation panel 14 may be waited for, and the process may be transitioned to step S3008 after the start key 46 is pressed.

According to the above-described embodiment, in the copier mode and the facsimile mode, buttons for setting conditions are displayed on the screen of the liquid crystal display panel 41, and button(s) which have already been pressed are displayed as being unfilled, and the number of buttons which have not yet been pressed is displayed. Therefore, by viewing the screen, the number and types of conditions which have not yet set can be known. Thereby, it is possible to know how long to continue input operations.

Note that the technology is not limited to the above-described embodiment, and can be embodied in various other different forms. For example, instead of displaying button(s) which have already been pressed as being unfilled and the number of buttons which have not yet been pressed, the number of conditions which have not yet been set may be displayed using a graph or the ratio of the number of conditions which have already been set to the number of conditions which have not yet been set may be displayed using a graph. Alternatively, the number of conditions which have not yet been set may be represented using a movement of animation.

Although the touch panel 42 is used to input conditions, a keyboard, a mouse, or the like may be used.

INDUSTRIAL APPLICABILITY

The technology may be applied to other types of electronic devices in addition to image forming devices. For example, microwave ovens have various functions, and therefore, conditions need to be set for each function. Since in microwave ovens and other similar devices, the conditions are input while the entry screens corresponding to such conditions are sequentially displayed. Also in microwave ovens and the like, it is useful to display, on a screen of a display device, to what degree conditions remain to be set.

The invention claimed is:

1. A display device of an electronic apparatus for setting a plurality of conditions for a process of the electronic apparatus through an input operation while displaying the conditions before the electronic apparatus performs the process in accordance with the conditions, the device comprising:
   determining means for determining whether or not each of the conditions has not yet been set; and
   display control means for displaying notifying information indicating to what degree conditions remain to be set, wherein the notifying information includes the number of conditions which have not yet been set, the number of conditions corresponding to input buttons for setting conditions, a numeral indicating the number of conditions which have not yet been set being displayed in a dedicated display field of the display control means, and wherein performance of the process is started when the number of conditions which have not yet been set reaches 0.

2. The display device of an electronic apparatus according to claim 1, wherein after items of the conditions are displayed, the notifying information is represented by switching a method of displaying each of the items of the conditions, depending on whether or not the item of the condition has already been set.

3. The display device of an electronic apparatus according to claim 2, wherein performance of the process is started when the display control means uses the displaying method to display that all the items of the conditions have already been set.

4. The display device of an electronic apparatus according to claim 2, wherein information for prompting an operation for starting performance of the process is provided when the display control means uses the displaying method to display that all the items of the conditions have already been set.

5. The display device of an electronic apparatus according to claim 1, wherein the conditions are set through an input operation to be either one of a default content and an arbitrary content.

6. The display device of an electronic apparatus according to claim 1, wherein a touch panel for inputting the conditions is provided on a display screen.

7. A display device of an electronic apparatus for setting a plurality of conditions for a process of the electronic apparatus through an input operation while displaying the conditions before the electronic apparatus performs the process in accordance with the conditions, the device comprising:
   determining means for determining whether or not each of the conditions has not yet been set; and display control means for displaying notifying information indicating to what degree conditions remain to be set, wherein the notifying information is the number of conditions that have not yet been set, the number of conditions corresponding to input buttons for setting conditions, a numeral indicating the number of conditions which have not yet been set being displayed in a dedicated display field of the display control means, and information for prompting an operation for starting performance of the process is provided when the number of conditions which have not yet been set reaches 0.

8. The display device of an electronic apparatus according to claim 7, wherein after items of the conditions are displayed, the notifying information is represented by switching a method of displaying each of the items of the conditions, depending on whether or not the item of the condition has already been set.

9. The display device of an electronic apparatus according to claim 8, wherein performance of the process is started when the display control means uses the displaying method to display that all the items of the conditions have already been set.

10. The display device of an electronic apparatus according to claim 8, wherein information for prompting an operation for starting performance of the process is provided when the display control means uses the displaying method to display that all the items of the conditions have already been set.

11. The display device of an electronic apparatus according to claim 7, wherein the conditions are set through an input operation to be either one of a default content and an arbitrary content.

12. The display device of an electronic apparatus according to claim 7, wherein a touch panel for inputting the conditions is provided on a display screen.

* * * * *